United States Patent [19]

Kindig et al.

[11] 4,026,009

[45] May 31, 1977

[54] APPARATUS AND METHODS FOR ALIGNING AND PLACING INSULATING MEMBERS IN MAGNETIC CORE SLOTS

[75] Inventors: Alan L. Kindig, Holland; Ronald H. Brown, Hamilton, both of Mich.

[73] Assignee: General Electric Company, Fort Wayne, Ind.

[22] Filed: Mar. 11, 1976

[21] Appl. No.: 666,143

[52] U.S. Cl. .................................. 29/596; 29/734; 29/235

[51] Int. Cl.$^2$ ........................................ H02K 15/10

[58] Field of Search ............. 29/205 D, 205 E, 596, 29/235; 310/214, 215, 42

[56] References Cited

UNITED STATES PATENTS

| | | | |
|---|---|---|---|
| 2,778,964 | 1/1957 | Balke | 310/214 |
| 2,934,099 | 4/1960 | Mason | 140/92.1 |
| 2,998,540 | 8/1961 | Phillips | 310/214 |
| 3,038,093 | 6/1962 | Needham et al. | 310/179 |
| 3,324,536 | 6/1967 | Hill | 29/205 E |
| 3,519,862 | 7/1970 | Walker | 310/214 |
| 3,579,818 | 5/1971 | Arnold et al. | 29/596 |
| 3,694,887 | 10/1972 | Walker et al. | 29/205 E |
| 3,748,510 | 7/1973 | McNeal | 310/71 |
| 3,797,105 | 3/1974 | Arnold | 29/205 D |
| 3,805,357 | 4/1974 | Peters | 29/205 E |
| 3,831,255 | 8/1974 | Smith et al. | 29/205 E |
| 3,872,568 | 3/1975 | Morr | 29/205 E |

*Primary Examiner*—Carl E. Hall
*Attorney, Agent, or Firm*—Ralph E. Krisher, Jr.

[57] ABSTRACT

One method includes supporting a core and winding assembly; and aligning and placing separator wedges along core slots. While advancing the wedges along the slots, the leading ends thereof are guided along a path that is spaced from wire segments in the slots and the wedges thus are restrained from following paths established by the wire segments. Preferably, at least some influence is exerted to urge the wedges toward the slot openings and thus away from the wire segments. This resiliently deforms the wedges which later are permitted to resiliently change to a "relaxed form" configuration, and assume a position adjacent to the wire segments. Disclosed apparatus includes a novel stator guide and guide ring. Wedge guiding means that may be in the form of a number of spring guide wire elements are arranged to extend axially from a location within a stator bore to a location radially outwardly of the bore. Leading ends of wedges can slide along the guide wires. Upon removal of the wedged core, the wedges spring toward their original shape and move toward wire segments in the core slots.

12 Claims, 7 Drawing Figures

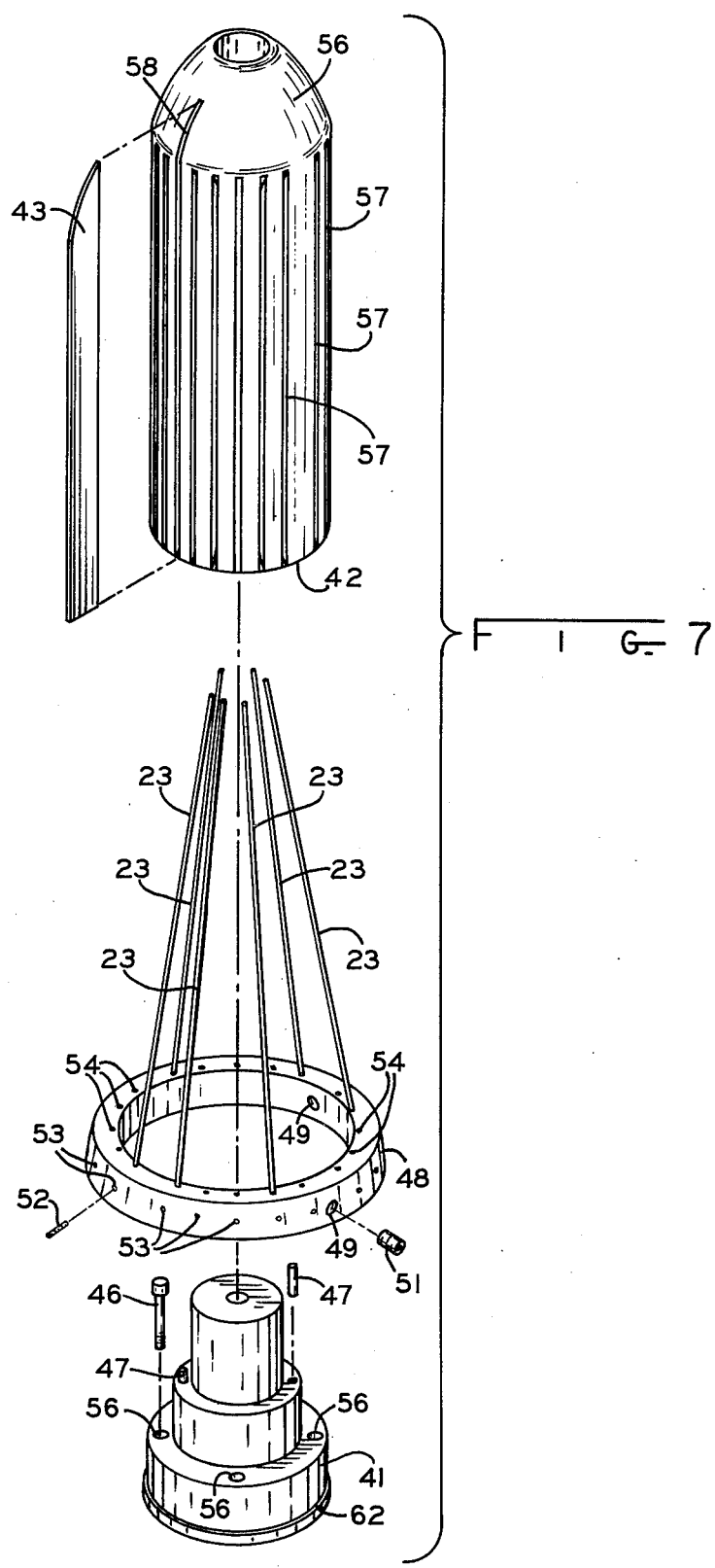

APPARATUS AND METHODS FOR ALIGNING AND PLACING INSULATING MEMBERS IN MAGNETIC CORE SLOTS

BACKGROUND OF THE INVENTION

The present invention relates generally to apparatus and methods for aligning and placing insulators, such as wedges, along slots of a magnetic core of a dynamoelectric machine.

Different types of dynamoelectric machines utilize insulating material of suitable dielectric strength for insuring that two or more different parts of such machine remain electrically insulated from one another.

For example, in many constructions, ground or cell insulation is frequently provided along the walls of slots in magnetic core members, and windings of a first phase are disposed along the insulated slots. In those instances where winding turn portions of a second phase are to share slots with turn portions of the first phase, it often is desirable to provide a layer of insulation between the turn portions of the different phases. For example, in the case of some electric motor stators with portions of a first winding phase located along the bottom or closed end of a number of different slots and with portions of a different winding phase located along the top or open end of some of the same slots, insulative "separators" or slot separator wedges extend axially along the shared slots and separate the wire segments of the different phases; whereas slot closing wedges are disposed at the open end of the slots.

Needham et al U.S. Pat. No. 3,038,093 which issued June 5, 1962 shows, in FIG. 3 thereof, details of different parts of an electric motor such as, e.g., slot liners (or slot "cells"); separators (or slot separator wedges); and pegs (or slot closing wedges). Other patents that show stator assemblies and insulators that are incorporated therein are Phillips U.S. Pat. No. 2,998,540 of Aug. 29, 1961; Balke U.S. Pat. No. 2,778,964 of Jan. 22, 1957; and Walker U.S. Pat. No. 3,519,863 of July 7, 1970.

Equipment has been available long heretofore which has been used to reliably place slot separator wedges in selected slots of a magnetic stator core concurrently with the placement of side turn portions of a winding in the bottoms of the slots; or to place slot closing wedges along the slots while winding turn portions are placed therein. Equipment of the general type just mentioned (as well as processes related thereto) are described, for example, in Arnold et al U.S. Pat. No. 3,579,818 of May 25, 1971; Smith et al U.S. Pat. No. 3,831,255 of June 25, 1973; Hill U.S. Pat. No. 3,324,536 of June 13, 1967; Walker et al U.S. Pat. No. 3,694,887 of Oct. 3, 1972; and Morr U.S. Pat. No. 3,872,568 of Mar. 25, 1975. The equipment described in the just mentioned patents may be used, as desired, to push slot separator or slot closing wedges vertically upwardly or downwardly, horizontally, or at any desired angle of inclination or declination along magnetic core slots. As will be appreciated from a review of the just mentioned patents, wedges are loaded into a magazine having a number of slots aligned with a stator holding or locating station; and the wedges ultimately are pushed by elongate pushers into and along preselected ones of the core slots-usually concurrently with the placement of winding turns therealong.

Although the equipment just discussed has been widely used in the motor industry, other types of equipment and processes have also been used whereby windings are made and placed in core slots without reference to wedges (either of the slot separator or slot closing type), and wedges must subsequently be placed in the core slots after winding turn portions have already been accommodated therein.

For example, winding coils may be developed on a simple lathe-type of machine and then machine-placed or hand-placed in core slots. Alternatively, coils per se may be developed and then placed in core slots with processes and equipment of the type described in Mason U.S. Pat. No. 2,934,099 of Apr. 26, 1960; or Arnold U.S. Pat. No. 3,797,105 of Mar. 19, 1974. It will be understood that in these cases it is then usually necessary to effect wedge placement after placement of some or all of the winding turns.

One type of equipment that has been used heretofore for effecting subsequent wedge placement has, in effect, been generally similar to that shown in the above referenced Arnold U.S. Pat. No. 3,579,818; or Hill U.S. Pats. No. 3,324,536, and 3,694,887. However, when wedges only are to be placed; it is common practice to eliminate those portions of the previously known equipment that are provided in order to handle winding turns; and to use an end turn blocking or shaping mechanism that will establish or maintain a desired clearance between previously placed winding end turns and paths along which wedges are to be moved into slots of a core. Prior equipment and methods pertaining to subsequent wedge placing and with which we are familiar are characterized by short comings in that wedges (and particularly slot separator wedges) frequently can be misplaced or improperly positioned within one or more of the core slots. When this condition occurs, it is necessary to manually reposition the misoriented slot separator wedges or, in extremely aggravated cases, manually remove misoriented slot separator wedges and then manually place a new slot separator wedge along such slots.

It is our belief and understanding that unacceptable amounts of misorientation of slot separator wedges during placement along previously placed windings is caused partly by the fact that the wedges will tend to follow the previously placed wire segments. Thus, such segments have, in effect, led the separator wedges into a misoriented position. This problem is aggravated, it is believed, by the fact that slot wedges are made of a relatively slippery material (e.g., polyethylene terephalate, one commercially available form of which is sold under the name MYLAR by E. I. DuPont DeNemours and Company). The slot liners also are often formed of this same (or an equivalent) material and the separator wedges therefore tend to readily slide into any position directed by the winding turn segments.

Peters U.s. Pat. No. 3,805,357 of Apr. 23, 1974 illustrates one approach that may be followed when attempting to overcome the misorientation problem just described. The approach of Peters, however, would require equipment substantially more complex than the wedge placing mechanisms used heretofore. Moreover, it is most desirable that wedge placer methods and equipment be both simple and readily usable with cores (and thus wedges) of many different axial lengths.

It should now be understood that it would be desirable to provide new and improved methods and apparatus whereby the above described and other problems may be readily overcome.

Accordingly, it is a general object of the present invention to provide new and improved methods and apparatus whereby slot separator wedges of a predetermined length may be placed in slots alongside previously placed winding turn segments in such a fashion that a desired predetermined orientation of the wedges relative to the segments and slot walls will be reliably established and maintained.

It is a more specific object of the present invention to provide new and improved methods and apparatus whereby wedges are moved along predetermined core slots having previously placed wire segments therein, with the wedges being maintained away from the wire segments; and thereafter causing the wedges to move generally radially along such slots and into proximity with the wire segments.

It is another specific object of the present invention to provide new and improved apparatus and methods whereby wedges are moved axially along a slot and held in a slightly resiliently deformed condition; and thereafter released to assume a less deformed configuration adjacent to wire segments that have been placed in such slot prior to placement of the wedge.

Another object of the present invention is to provide new and improved methods and apparatus for placing slot separator wedges, with such apparatus and methods being relatively simple in nature but most reliable in operation.

Yet another object of the present invention is to provide new and improved apparatus and methods whereby separator wedges are pushed from one end thereof along guide means along core slots.

Although the present invention will be readily understood by persons skilled in the art after the following summary and detailed description are reviewed; persons less familiar with the art may find it desirable to review the above referenced patents for a better understanding of the background of the invention. For this reason, the disclosures of the above referenced patents are incorporated herein by reference. Of particular interest to features claimed by us are those portions of the above cited U.S. Pats. Nos. 3,579,818; 3,324,536; 3,831,255; 3,694,887; and 3,872,568; that relate to wedge making and wedge placing mechanisms, and the Peters U.S. Pat. No. 3,805,357.

SUMMARY OF THE INVENTION

In carrying out the above and other objects of the present invention, we provide new and improved methods, a first one of which includes (in one preferred form thereof) supporting a slotted magnetic core and at least some previously placed winding turns in a desired position adjacent to wedge placing apparatus. The previously placed winding turns generally are located along the bottom or closed end of preselected ones of the core slots. Separator wedges are aligned with one end of the preselected magnetic core slots and axially advanced through the core slots by pushing the trailing end of the wedges. While the wedges are being advanced, the leading ends thereof are guided along the core slots away from the previously placed wire segments, and the wedges are restrained from engaging and following paths established by the wire segments. Preferably, at least some pressure is applied to the wedge in a direction to urge the wedge toward the open end of the slot and thus away from the wire segments in the slots. After the desired axial movement of the wedges along the core slots has been carried out, the somewhat deformed wedges are permitted to resiliently change their configuration and assume a position adjacent to the previously placed wire segments. Thus, at least one form of our invention contemplates the application of a generally axially directed force at only the trailing end of a wedge to cause axial movement of the wedge into and along a core slot. Concurrently with the application of the axially directed insertion force; at least the leading end of the wedge is urged by guide means generally away from wire segments in the bottom of the slot, and yet the slot walls (or another guide member) interact with at least the leading end of the wedge to retain the wedge within the slot during axial movement of the wedge.

In a preferred form of apparatus illustrated herein, and which embodies the invention in one form thereof, we have illustrated a wedge inserting apparatus that includes a novel guide tube along which a stator core is positioned. The guide tube is attached to the base of a conventional and prior art type of wedge making, storage, and inserting mechanism. A novel guide ring of our design is carried by the mechanism base, the guide ring being arranged to hold first or proximal ends of a plurality of wedge guiding means that have been illustrated in the form of a number of spring guide wires. Distal or second ends of the guide wires are free, but initially located along alignment means (such as grooves or notches) formed in the guide tube. When a slotted stator core is positioned over the guide tube, slots of the core are aligned with tracks of a previously known wedge magazine along which previously known wedges and wedge pushers are movable. The guide wires are located so as to extend in an axial and radial direction from a location within the bore of a stator at one end thereof to a location radially outwardly of the bore of the stator at the other end thereof. As wedges are moved generally axially into and along the core slots, the leading ends of the wedges enter the slots and slide along the guide wires while the guide wires urge the wedges away from wire segments previously placed in the core slots. After the wedges have been axially inserted along the slots; the then existing stator assembly is removed from the apparatus. Upon separation of the wedges and guide wires, the wedges (which are held resiliently deformed by the guides) spring back to their original shape and move radially toward wire segments in the core slots.

The subject matter which we regard as our invention is particularly pointed out and distinctly claimed in the concluding portion of this specification. Our invention itself, however, both as to its organization and mode of operation, together with further objects and advantages thereof, may best be understood by reference to the following description taken in connection with the accompanying drawings.

BRIEF DESCRIPTION OF THE DRAWINGS

FIG. 7 is an exploded perspective view of novel parts of the apparatus shown in FIG. 6, which parts would be added by us to previously known wedge inserting mechanisms in order to illustrate the presently preferred mode of carrying out our invention.

DESCRIPTION OF THE PREFERRED EMBODIMENTS

Figure 1:
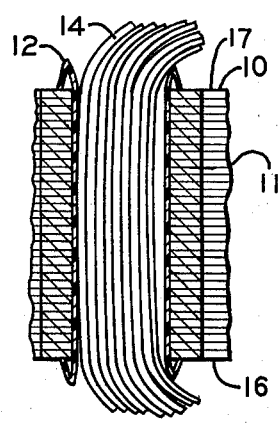
FIG. 1 is an elevational view, with parts removed, parts in section, and parts broken away, of a magnetic stator core having ground insulation and winding turn segments carried by a preselected slot thereof.

Referring now to FIGS. 1-5 of the drawings, it will be appreciated that we have illustrated parts of a stator assembly 10 that includes, inter alia, a slotted magnetic core 11 which may be made up of a plurality of magnetizable laminations; slot liners 12 carried by the core; and wire segments 14 that in reality are part of a winding carried by the core slots. Only fragments of the stator assembly 10 have been illustrated in order to simplify the illustration and description thereof, but it will be understood by persons skilled in the art that the stator core 11 is a generally doughnut-in-shape structure having a first end face 16, a second end face 17, and a plurality of slots 18 extending between the first and second faces 16, 17.

Figure 5:
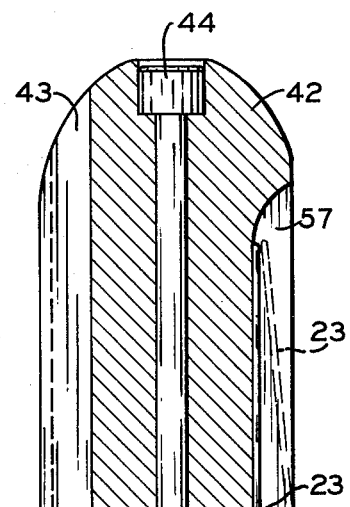
FIG. 5 is a view taken generally along the lines 5—5 in FIG. 4, and this view further illustrates guiding means, in the form of a spring steel guide wire, that is utilized to urge the wedge toward the bore of the core.
Figure 5:
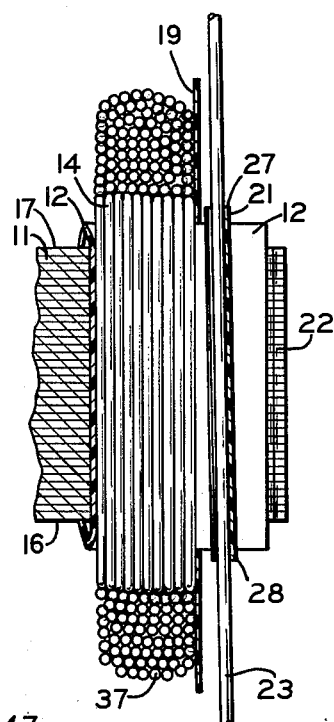

Slot liners 12 may be formed of any suitable material (such as electrically insulating paper or, more preferably, polyethylene terephalate). Alternatively, a suitable insulative coating of a material such as an epoxy resin may be used in lieu of the slot liners. FIG. 5 reveals parts of a "phase" or "window" insulator 19. This insulation may be substantially as shown and described in McNeal U.S. Pat. No. 3,748,510 which issued on July 24, 1973. Alternatively, the phase insulation 19 may be small, unconnected segments of insulation that are ultimately trapped between adjacent end turns of different winding phases.

Although a complete stator assembly has not been illustrated in the appended drawings (other than the phantom showing in FIG. 6); the details of entire stator assemblies are well known by persons skilled in the art. This knowledge is evidenced, for example, in the above referenced Needham et al patent.

Referring now once again to FIG. 1, it is to be understood that the wire segments 14 are disposed (ultimately, along with other wire segments) in a number of preselected slots 18. After the wound coil or coils that include segments 14 have been disposed in the core slots, it is desirable to place a separator or "separator wedge" (as illustrated for example at 21 in FIG. 2) along the wire segments 14 that are in a slot that is to ultimately accommodate portions of another winding. It is to be understood that "different winding phases" means different winding sections, whether they be for different phases in a typical poly-phase motor; or whether they be main and capacitor winding phases, or main, extended main, or starting phases in split-phase motors.

When prior equipment has been utilized for placing wedges 21, it has become apparent that the wedges 21 may (if permitted to follow along wire segments 14 during placement thereof) track along a wire segment and ultimately become drastically misoriented. This is represented, for example, by the orientation of wedge 21 in slot 18 as shown in FIG. 3 after it would have tracked the wire segment 15.

Figure 3:
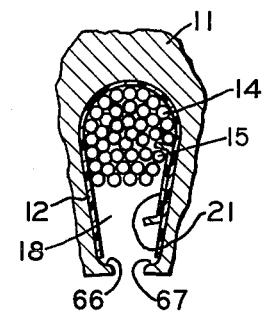
FIG. 3 is a view substantially the same as FIG. 2 except that FIG. 3 shows the slot separator wedge in an orientation that might occur if the wedge followed the path of a winding turn during wedge placement within the slot.
Figure 4:
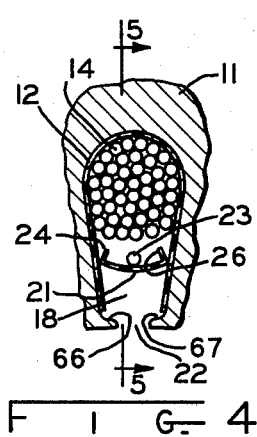
FIG. 4 is a view substantially similar to FIG. 2 but which illustrates the slot separator wedge being guided along the slot during placement of the wedge (or held in place by a guide wire just after wedge placement)

The objectionable condition depicted in FIG. 3 may be avoided by utilizing a process wherein a wedge (or wedges) is restrained from contacting the wire segments 14 until after the wedge is finally positioned axially within a slot 18. With reference to FIGS. 4 and 5, one method by which we can achieve this desirable objective will now be described.

With specific reference to FIG. 4 it will be observed that the wedge 21 has been illustrated in a resiliently deformed or bowed condition. This is because the wedge is constrained to remain toward the slot opening 22 by an elongate guide means (that has been illustrated as a segment of a spring steel guide wire 23). During the time that the wedge 21 is being moved axially along the slot 18, the guide wire 23 will hold the wedge 21 away from the wire segments 14; and the legs 24, 26 of the wedge therefore cannot become enmeshed with and guided by any of the wire segments 14. The relationship between the wedge 21, guide wire 23, and wire segments 14 within the slot 18 (both during and at the end of a wedge insertion step) is clearly revealed in FIG. 5.

Figure 2:
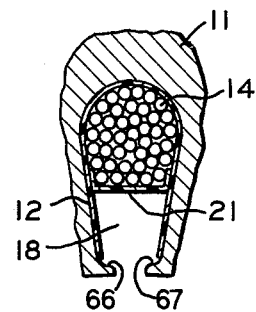
FIG. 2 is a cross sectional view (with parts broken away) of the structure shown in FIG. 1, assuming that FIG. 1 was shown in full, and wherein a slot separator wedge has been added in the preselected slot in desired orientation relative to the previously placed wire segments.

After the wedge 21 has been positioned as desired axially along the slot so that the leading and trailing ends 27, 28, of the wedge are positioned as desired axially relative to the end faces 16, 17 of the core; the core assembly (including one or more wedges 21) and guide wires are moved axially relative to one another so that the wedges are free to resiliently spring or snap toward the bottoms of the slots and assume the relative position therein depicted by FIG. 2.

Figure 6:
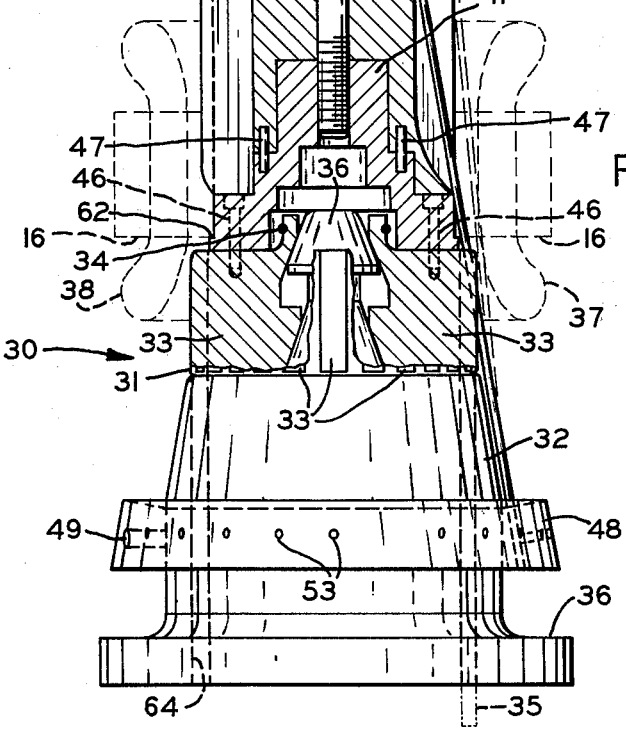
FIG. 6 is a view in elevation, with parts broken away and parts removed, of apparatus embodying the invention in one form and that may be utilized to carry out our invention in a preferred form thereof.

FIGS. 6 and 7 have been provided primarily to illustrate one form of apparatus that may be utilized during the practice of the invention described hereinabove.

More specifically, FIG. 6 illustrates different parts of a machine or apparatus 30, some parts of which have been in use long prior to the present invention. The apparatus 30 includes a wedge guide cage 31, a wedge guide housing 32, and a plurality of expandable blades 33 which move radially relative to the cage 31 for the purpose of establishing an unobstructed path for wedges as they are pushed from the housing 32 toward a stator core. The blades 33 are biased to an innermost position by a garter-like spring 34 and other not shown springs. These blades are urged radially outwardly by the action of an axially movable cam 36. A plurality of wedge pushers (a portion of one of which is illustrated in phantom at 35) are movable along axially extending paths established by the housing 32 and by radially extended pairs of blades 33. The parts of apparatus 30 specifically described in this paragraph are old in the art and have been utilized prior to our invention.

It will be understood that a wedge maker and wedge magazine of any conventional type are positioned beneath the base 36 of the housing 32. Thus, wedges are made by the not shown wedge maker and placed in the not shown magazine. Then, at appropriate times, the leading ends of a number of wedge pushers 35 will move upwardly along the apparatus 30 to advance wedges from the wedge magazine, along the housing 32, and ultimately along preselected slots of the stator assembly 10.

Although the movable blades 33 have been used prior to the present invention, it is now noted (primarily for background purposes) that the movable blades 33 are effective to insure that end turns 37, 38 of the windings of the stator assembly 10 are moved or held radially outwardly from the path taken by wedges 21 as they are being inserted axially into the slots of a stator. Wedge makers, wedge pushers, and wedge magazines usuable with or as part of the apparatus 30 are shown and described in detail in the prior art referenced hereinabove. Accordingly, additional details concerning such components are not included herein except by reference to such prior art.

With continued reference to FIG. 6, it will be observed that we have provided an adaptor 41, a cage or guide tube 42, an alignment key 43, a plurality of guide wires 23, and means in the form of a bolt 44 for fastening the guide tube and adaptor together.

The adaptor 41 is shown fastened to the cage 31 by means of four bolts 46; and the guide tube 42 is aligned so that holes therein will meet with dowel pins 47 which seat in the adaptor 41. The bolt 44 of course fastens the guide tube 42 to the adaptor 41. A novel guide wire retaining ring 48 is provided with at least two set screw receiving apertures 49 by means of which the ring 48 is clamped to the wedge guide housing 32. The holder ring is provided with a plurality of intersecting hole pairs, one of which accommodates a guide wire 23 and the second of which accommodates a set screw that is utilized to clamp a guide wire 23 end in the ring 48.

In FIG. 7, we have illustrated the guide tube 42; key 43; guide wires 23; holder ring 48; one of the set screws 51 that are received in the tapped holes 49 of the holder ring; and one of the set screws 52 which is accommodated in the openings 53 of ring 48 for locking in place guide wires 23 that have been positioned in preselected ones of the apertures 54 in ring 48. Screws 46 are, of course, accommodated by holes 56 in the adaptor 41.

In the fabrication of the parts illustrated in FIG. 7, we deem it to be preferable to machine the guide tube 42 from a substantially solid piece of material. We machine the free or distal end 56 thereof to provide a tapered configuration so that a stator core may be easily centered with respect thereto and then slid therealong. The body of the guide tube 42 is provided with a number of milled slots 57 to form a cage-like structure along which the free or distal ends of the guide wires 23 may be disposed as best revealed in FIG. 6. The tube 42 has yet another slot 58 milled therein in which the key 46 may be press fit or soft soldered. The key 46 then interfits with a stator slot opening and ensures that the stator slots will be properly aligned with the guide wires 23 and wedge guide housing paths.

In one actual reduction to practice of the invention, the guide wires 23 were made from pre-straightened music wire having a diameter of .060 of an inch. Music wire was utilized because it is a commonly available, relatively low cost form of spring steel. However, substantially any other type of material could be used provided that it had suitable spring and strength characteristics for the intended application. The springy characteristic of the guide wires is useful because the guide wires are relied upon to hold the wedges 21 away from wire segments 14 that have been previously positioned in a core slot 18 as discussed hereinabove. Similarly, the material selected for use as the guide wires 23 should be sufficiently strong to prevent such wires from yieldably bending as they are stressed to dotted line positions thereof as illustrated for example by the phantom line position of wire 23 in FIG. 6.

It is noted that even though round guide wires have been illustrated, the shape thereof is not believed critical to successfully practicing the invention; and rectangular, flat, or other shapes of elongate flexible wedge guides clearly could be used. As wedges 21 are pushed in a generally axial direction along slots 18 of a magnetic core, the distal ends of the guides 23 (i.e. the ends nearest core face 17) are moved radially toward the closed ends of slots 18 due to the inter-action of the guides and wedges during the insertion process.

During operation of the apparatus of FIG. 6, the stator assembly 10 is positioned as illustrated with the face 16 of the core resting on the abutment surface or ledge 62 of adaptor 41. Thereafter, when the apparatus 30 is actuated, power means (such as an air or hydraulic cylinder) will drive the cam 36 upwardly and cause the movable blades 33 to expand radially outwardly in order to establish therebetween restricted pathways for slot wedges, with such restricted pathways being in alignment with the pathways 64 established along the wedge guide housing 32 and also being in alignment with the stator slots 18. Since the blades 33 expand radially outwardly, they insure that winding end turns 37 and 38 will be moved or held outwardly away from the path of the moving wedges.

After the cam 36 has been actuated to expand the movable blades 33, the wedge pushers 35 are actuated so as to move the wedges 21 axially upwardly along the wedge guide housing 32, and along the extended paths established between adjacent pairs of the expandable blades 33. While the wedges are advancing between adjacent blades 33, the lead end of the wedges engage guide wire 23 and follow the guide wire as the insulator enters a slot 18. Then, as the wedge pushers continue to move the wedges axially along the core slots, the wedges are constrained to remain within the slot 18 by tooth tips 66, 67 (see FIGS. 2–4) or slot sidewalls. Thus, the wedges resiliently deflect the guide wires 23 and cause them to move radially toward the closed ends of the core slots. Concurrently, the guide wires 23 constrain the wedges 21 to remain toward the bore of the stator assembly (which in turn is defined by adjacent tooth tips 66, 67 etc.).

The guide wires 23 are so dimensioned and have strength and flexibility characteristics such that they may be deflected by the advancing wedges and yet not be so stiff as to tear the wedges. The shape of the tube 42 is such that the surface portions thereof between slots 57 prevent wedges from being forced out of the slots 18 past the tooth tips 66, 67. After a predetermined number of wedges have been inserted in a corresponding number of preselected slots 18 of the stator assembly 10 (as determined by the slots that are to share wire segments of different phases); the stator assembly is removed from the guide tube 42. At this time, the wedges 21 will snap or slip to the desired position thereof adjacent to wire segments 14 as previously discussed hereinabove.

Although it has not been previously mentioned, it will be understood that clamp arms may be provided (as has been done herebefore) to hold the stator assembly 10 clamped against the abutment surface or ledge 62 during the end turn forming and wedge inserting process that has just been described.

While two preferred embodiments of the present invention have been described as preferred specific forms, it will be understood that still other forms might be utilized, all as will be readily apparent to persons of ordinary skill in the art. Moreover, it will be readily apparent and obvious to those skilled in the art that changes and modifications may be made without departing from the invention. It is therefore intended in the appended claims to cover all such changes and modifications that fall within the spirit and scope of the invention.

What we claim as new and desire to secure by Letters Patent of the United States is:

1. A method of placing insulating members along preselected slots of a slotted magnetic core having previously positioned wire segments disposed along closed ends of the slots; the method comprising: relatively positioning a plurality of preselected slots of the magnetic core in alignment with at least a corresponding number of elongate insulator guide means and a pathway for a corresponding plurality of elongated insulating members having a length at least generally commensurate with the axial length of the slots in the magnetic core, with different ones of the elongate guide means extending axially and radially with respect to individual ones of the slots so that a first portion of each elongate insulator guide means is disposed within a slot and a second portion of each such elongate insulator guide means is disposed radially inwardly of the stator bore opening for such slot; pushing the trailing end of the insulating members axially toward and into the core slots and engaging the first portions of an elongate insulator guide means with the leading end of at least one insulating member, and continuing to push the trailing end of the insulating members while at least the leading end of the at least one insulating member is guided along a preselected core slot by the elongate insulator guide means so that the at least one insulating member follows a path such that the at least one insulating member is held in spaced relationship to the wire segments disposed within the core slot; and ceasing to push the insulating members after they have been positioned in a desired axial position relative to the core slots.

2. The method of claim 1 further comprising resiliently deforming the at least one insulating member as it advances axially along the preselected core slot.

3. The method of claim 2 further comprising moving the magnetic core, wire segments, and axially positioned insulating members from the guide means and thereby permitting resilient movement of the at least one insulating member radially toward the wire segments in the preselected slot.

4. A method of placing at least on slot separator wedge in at least one preselected slot of a magnetic core having wire segments previously positioned adjacent a closed end of the at least one preselected slot, the method comprising: disposing an insulator guide element axially along an axially extending opening of the slot so that the guide element extends at least somewhat axially from a position within the slot at a first end face of the core to a position at least closely adjacent to the bore of the core adjacent a second end face of the core; and advancing a slot separator wedge in a direction generally axially along the core slot toward the second face of the core; said method including engaging the guide element with the leading end of the wedge and constraining the leading end of the wedge to follow the guide element axially along the slot so that at least the leading end of the wedge is prevented from engaging the wire segments previously disposed in the core slot.

5. The method of claim 4 further comprising substantially simultaneously placing a plurality of wedges in a corresponding plurality of magnetic core slots.

6. Apparatus for use in placing insulating members in preselected ones of a plurality of slots of a magnetic core having first and second end faces and bore establishing surfaces extending therebetween; said apparatus comprising means for establishing a desired predetermined alignment between preselected ones of the magnetic core slots and a correspondingly preselected number of wedge path defining means; flexibly deflectable, axially extending elongate means for extending axially and radially from a location within the bore of a core at one end thereof to a location radially outward of the bore at the other end of the core, and for both guiding insulating members axially along the preselected core slots and urging at least the leading ends of such members toward the bore; and axially movable means for pushing the trailing end of the insulators and axially advancing the insulators along and subject to the restraint of the guide means.

7. The apparatus of claim 6 wherein the insulator guide means comprise a plurality of flexible guiding elements.

8. The apparatus of claim 7 wherein the guide means comprise metallic spring elements.

9. The apparatus of claim 8 wherein the guide means comprise a plurality of guide wires.

10. A method of placing insulating members along at least one slot of a slotted magnetic core having previously positioned wire segments disposed along such at least one slot; the method comprising: relatively positioning the magnetic core with the at least one slot in alignment with a pathway for an elongate insulator, and relatively positioning the core and an elongate deflectable insulator guide so that the guide extends at least somewhat axially with at least a portion thereof within the at least one slot; moving an elongate insulator at least generaly axially into the at least one slot and laong the guide; and guiding the insulator axially along the slot in radially spaced relation to the previously positioned wire segments.

11. A method of placing at least one slot separator wedge in at least one preselected slot of a magnetic core having wire segments previously positioned adjacent a closed end of the at least one preselected slot, the method comprising: relatively positioning at least one insulator guide element and the core with the at least one guide element extending at least somewhat axially along an axially extending opening of the slot so that the guide element extends from a position within the slot at a first end face of the core and generally toward a second end face of the core; and advancing a slot separator wedge in a direction generally axially along the core slot toward the second face of the core; said method including engaging the guide element with the leading end of the wedge and constraining the leading end of the wedge to follow the guide element axially along the slot so that the wedge is held against walls of the slot and so that at least the leading end of the wedge is restrained from engaging and following paths established by the wire segments previously disposed in the core slot.

12. Apparatus for use in placing insulating members in at least one of a plurality of slots of a magnetic core having first and second end faces and bore establishing surfaces extending therebetween; said apparatus comprising means for establishing a desired predetermined alignment between at least one of the magnetic core slots and at least one wedge path defining member, at least one deflectable axially extending elongate member for guiding an insulating member axially along the preselected core slot; and axially movable means for pushing the trailing end of the insulator and axially advancing the insulator along the elongate member; said elongate member being arranged to extend axially and radially from a location within the bore of the core at one end thereof to a location radially outward of the bore at the other end of the core, and wherein said elongate member constitutes means for urging at least the leading end of the insulator toward the bore while the insulator is advanced axially therealong.

* * * * *

UNITED STATES PATENT AND TRADEMARK OFFICE
CERTIFICATE OF CORRECTION

PATENT NO. : 4,026,009
DATED : May 31, 1977
INVENTOR(S) : Alan L. Kindig and Ronald H. Brown It is certified that error appears in the above-identified patent and that said Letters Patent are hereby corrected as shown below:

Col. 1, line 40, change "3,519,863" to --3,519,862--.
Col. 7, line 15, change "usuable" to --usable--.
Col. 9, line 60, change "on" to --one--.
Col. 10, line 49, change "laong" to --along--.

Signed and Sealed this

Thirtieth Day of May 1978

[SEAL]

Attest:

RUTH C. MASON
Attesting Officer

LUTRELLE F. PARKER
Acting Commissioner of Patents and Trademarks